(12) United States Patent
Yao et al.

(10) Patent No.: US 6,663,938 B1
(45) Date of Patent: Dec. 16, 2003

(54) MEDIA CONTACT ZONE WITH BELL-SHAPED TEXTURING FEATURES

(75) Inventors: Wei H. Yao, Fremont, CA (US); Yuh-Jen Cheng, Cupertino, CA (US); Li-Ping Wang, Fremont, CA (US); David S. Kuo, Castro Valley, CA (US); Chiao-Ping Ku, Fremont, CA (US); Bruno Marchon, Palo Alto, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/210,018

(22) Filed: Dec. 11, 1998

(Under 37 CFR 1.47)

Related U.S. Application Data

(60) Provisional application No. 60/069,540, filed on Dec. 12, 1997.

(51) Int. Cl.[7] .................................................. G11B 5/82
(52) U.S. Cl. ...................... 428/141; 428/64.2; 428/65.3; 428/426; 428/694 SG; 360/135
(58) Field of Search ................................ 428/141, 64.2, 428/426, 695 SG, 900, 65.3; 360/135

(56) References Cited

U.S. PATENT DOCUMENTS

| 5,062,021 A |   | 10/1991 | Ranjan et al. |
| 5,108,781 A |   | 4/1992  | Ranjan et al. |
| 5,861,196 A | * | 1/1999  | Kuo et al. .................. 427/555 |
| 5,958,545 A | * | 9/1999  | Kuo et al. .................. 428/65.3 |
| 5,978,189 A | * | 11/1999 | Habu ........................ 360/135 |
| 6,217,970 B1 | * | 4/2001 | Arita et al. ................ 428/65.3 |

FOREIGN PATENT DOCUMENTS

| WO | WO 97/07931 | 3/1997 |
| WO | WO 97/43079 | 11/1997 |
| WO | WO 98/40879 | 9/1998 |
| WO | WO 98/41393 | 9/1998 |

* cited by examiner

*Primary Examiner*—Stevan A. Resan
(74) *Attorney, Agent, or Firm*—Raghunath S. Minisandram; Jesus Del Castillo

(57) ABSTRACT

A magnetic data recording medium substrate has a contact zone and a data zone. The contact zone is textured by forming multiple texturing features, each having a bell-shaped profile resembling a Gaussian curve. The features preferably are formed by pulsed laser energy applied to a glass substrate, or to an aluminum nickel-phosphorous substrate coated with a glass layer. As compared to previous laser texturing approaches, the laser beam is less narrowly focused to provide a beam impingement area with a diameter of at least three microns, forming texturing features with diameters of at least three microns. The texturing features preferably are uniform in height and diameter, and may be symmetrical or have asymmetrical aspects, so long as bell-shaped profiles are present in the direction of travel of the recording medium, relative to transducing heads.

33 Claims, 14 Drawing Sheets

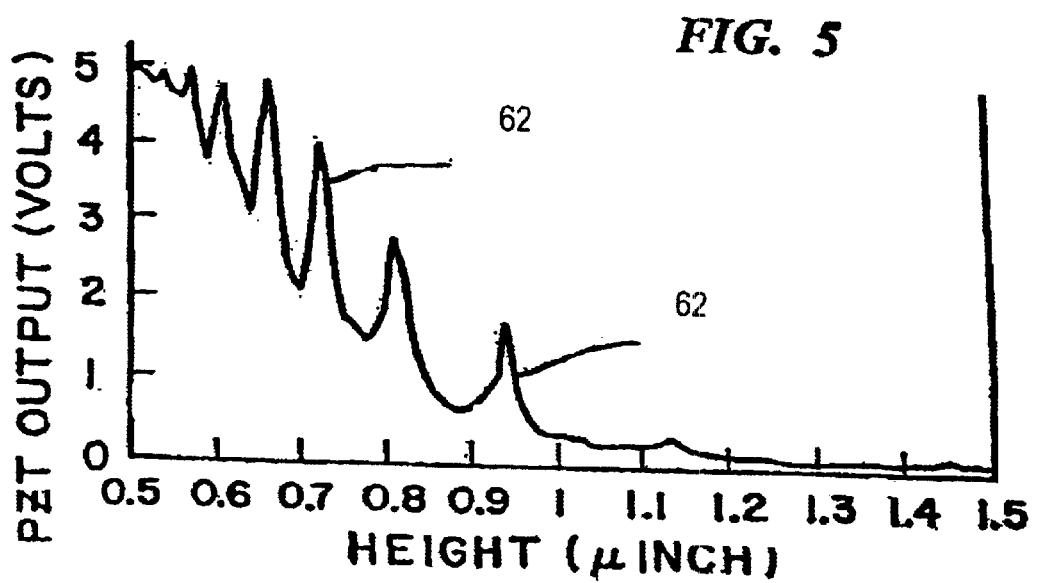

MEDIA CONTACT ZONE WITH BELL-SHAPED TEXTURING FEATURES

This application claims the benefit of Provisional Application No. 60/069,540 entitled "Optimal Laser Texture Bump Shape for Glide Testing," filed Dec. 12, 1997.

BACKGROUND OF THE INVENTION

The present invention relates to the texturing of magnetic data storage media, and more particularly to the texturing of dedicated transducing head contact zones (also called landing zones) of such media to reduce friction and improve wear, while also minimizing system resonance.

Laser textured magnetic disks, particularly those textured over areas designed for contact with data transducing heads, are known to reduce friction and improve wear characteristics as compared to mechanically textured disks. Traditional laser texturing involves focusing a laser beam onto a disk substrate surface at multiple locations, forming at each location a depression surrounded by a raised rim as disclosed in U.S. Pat. No. 5,062,021 (Ranjan) and U.S. Pat. No. 5,108,781 (Ranjan). An alternative, as disclosed in International Publications No. WO 97/07931 and No. WO 97/43079, is to use a laser beam to form domes or nodules, rather than rims. In some cases, each of the domes is surrounded by a raised rim. The features can have either circular or elliptical profiles.

Collectively, the texturing features form a texture pattern or distribution throughout the head contact zone. A particularly preferred pattern is a spiral, formed by rotating the disk at a controlled angular speed while moving a laser radially with respect to the disk. The laser is pulsed to form the individual texturing features. For example, the disk can be rotated to provide a circumferential speed of about one meter per second. Then, operating the laser at 50,000 pulses per second provides a 20 micron circumferential pitch, i.e. distance between adjacent texturing features. The radial speed of the laser controls the radial pitch or spacing between adjacent turns of the spiral, which also can be about 20 microns.

Although this approach has been highly successful in terms of reducing dynamic friction and improving the wear characteristics of dedicated transducing head contact zones, the regular, repeating pattern of the laser texture features produces strong input excitations based on the fundamental frequency of the circumferential pitch, including higher order harmonics. When the excitation frequencies coincide with natural frequencies of the slider or its gimbal and support system, resonance occurs which results in a high amplitude acoustic energy signal, which can increase the difficulty of determining the glide avalanche breaking point (a disk/transducing head spacing value) and yield a false indication that the disk has failed a glide test.

Several previously proposed media texturing alternatives address these difficulties to a degree. For example, the aforementioned International Publication Number WO 97/43079 includes the observation that mechanically textured disks, as compared to laser textured disks, produce less acoustic energy during head take-off and landing. A noise-reducing texturing alternative is discussed therein; namely, rows of rims connected to one another at their ends, as shown in FIG. 15 of the publication. In International Application Serial No. PCT/US98/05283 entitled "Low Resonance Texturing of Magnetic Media," filed Mar. 13, 1998, resonance-reducing texturing is disclosed in the form of elongate circumferential ridges, most notably a continuous ridge in the shape of a spiral throughout the transducing head contact region. Although these alternatives afford considerable reduction in noise during head take-off and landing, there remains a need for noise-reducing texturing arrangements compatible with substantial spacing between adjacent texturing features. These arrangements frequently are preferred due to lower manufacturing costs and better potential for producing a uniform roughness throughout the head contact zone.

According to another alternative approach, the contact zone is textured with an irregular sequence of spaced-apart texturing features forming a substantially circumferential, spiral path. Multiple turns of the spiral path define a uniform radial pitch. By contrast, the circumferential pitch is irregular, determined according to a pseudo random function in which the actual spacing intervals vary about a nominal interval, over a range comparable to but generally less than the nominal interval. This approach is disclosed in International Application Serial No. PCT/US98/05340 entitled "Magnetic Media with Randomly Positioned Texturing Features," filed Mar. 18, 1998. While this approach has been found quite useful in minimizing resonance effects, the manufacturing advantages afforded by texture patterns of constant radial and circumferential pitch underline the desire for texturing approaches that minimize resonance effects without the need for random spacing intervals. More particularly, randomizing circumferential pitch involves additional control equipment, e.g., a random signal generator or means to accelerate and decelerate a rotating substrate disk. Also, care must be taken to assure that a texture pattern, although randomized, has a substantially constant average feature density across a slider contact area.

Therefore, it is an object of the present invention to provide a substrate texturing process in which resonance effects are minimized without randomizing the spacing between adjacent texturing features, in particular without randomizing circumferential pitch within an annular contact zone.

Another object is to provide a substrate for a magnetic data recording medium, in which multiple texturing features formed within a contact zone of the substrate are specially shaped to reduce resonance effects.

A further object is to provide a process for forming multiple texturing features on the substrate surface of a substrate for a data recording medium, in which the texturing features exhibit fast roll-off profiles, more particularly bell-shaped profiles that more effectively diminish higher order harmonics excitation.

Yet another object is to provide a data recording medium with a dedicated transducer contact zone textured to minimize the occurrence of false failure episodes during glide avalanche testing.

SUMMARY OF THE INVENTION

To achieve these and other objects, there is provided a substrate for a magnetic data storage medium of the type including a data zone for storing data and a contact zone textured for a contact with a data transducing head maintained apart from the data zone by an air bearing during use of the data storage medium. The substrate includes a substrate body having a substantially planar substrate surface including a data zone and a contact zone. The substrate body is adapted for movement substantially parallel to the substrate surface in a predetermined direction with respect to a data transducing head. Multiple texturing features are formed in the contact zone, and are projected outwardly from the substrate surface. Each of the texturing features has bell-shaped profiles taken in planes substantially perpendicular to the substrate surface and oriented in the predetermined direction. The texturing features further have diameters, taken in the predetermined direction, of at least about three microns.

As used in this application, the term "bell-shaped profile" refers primarily to the smoothness of the profile, and to the nature of its changing slope. In particular, for a texturing feature projected upwardly from a horizontal surface, the slope is zero (representing a horizontal segment) at the point of maximum texturing feature height. The profile curves in both directions away from the maximum height point, in both cases with the slope smoothly increasing, until a maximum slope is reached along a medial region between the horizontal surface and the height of the texturing feature. Then, on both sides the curve continues its downward course, but with a smoothly decreasing slope, thus to create at the bottom of the profile an outward flare.

Preferably the maximum height point is at the center of the profile, with the profile being symmetrical about the maximum height point. In fact, most preferably each profile represents a Gaussian curve, i.e., a normal curve, with the maximum height at the center, corresponding to the mean in the usual Gaussian curve, and with a standard deviation $\sigma$ corresponding to at least 0.5 microns, so that the $6\sigma$ span that encompasses over 99.7% of the area beneath the curve corresponds to a diameter of at least three microns.

The texturing features can be formed with uniform heights and diameters. Preferably, uniform heights are within the range of 5–30 nm, and diameters are in the range of 3–5 microns.

Although the bell-shaped profiles are of particular importance in the predetermined direction of travel relative to transducing heads, the texturing features also can exhibit bell-shaped profiles in planes perpendicular to the substrate surface, and substantially perpendicular to or at inclined angles with respect to the predetermined direction.

A surprising and beneficial result of the multiple bell-shaped texturing features is the rapid decay of the higher order harmonics of fundamental excitation frequencies. This considerably diminishes the likelihood of resonance effects due to frequencies arising due to circumferential pitch interacting with natural frequencies of the PZT slider or its gimbal and support system. Accordingly, glide avalanche testing is much less likely to yield false indications of failure, even when the texture pattern has a constant circumferential pitch.

Another aspect of the present invention is a process for selectively texturing a recording medium substrate, including the following steps:

a. providing a substrate body having a substantially planar substrate surface; and b. within a selected zone of the substrate surface, forming multiple texturing features, each texturing feature having a bell-shaped profile taken in planes substantially perpendicular to the substrate surface and in a predetermined direction of travel of the substrate body relative to a data transducing head when a data recording medium incorporating the substrate body is used in conjunction with the data transducing head to perform data operations.

Preferably the texturing features are formed by directing a pulsed coherent energy beam toward the substrate body and causing the coherent energy beam to impinge upon the substrate surface at a plurality of selected locations thereon, altering the topography of the substrate surface at each selected location to form one of the texturing features. An area of impingement of the coherent energy beam on the substrate surface has a diameter of at least three microns.

This is the presently preferred texturing method, and involves a departure from the prevailing tendency in the art favoring smaller laser texturing features, e.g., with diameters of at most 1 micron. To form the larger-diameter texturing features, the laser energy beam is maintained at approximately the same power level, but is not focused to the extent previously deemed appropriate, so that the area of impingement on the substrate surface has the desired size of at least three microns rather than a diameter of 1 micron or less.

Further, it has been found that texturing features formed on aluminum nickel-phosphorus substrates tend to assume crater or sombrero shapes, more particularly with a rounded rim above the substrate surface encircling a depression. Thus, it has been found useful to apply a glass layer to an Al Ni—P substrate before texturing. A glass substrate, on the other hand, can be laser textured directly.

Other techniques are contemplated for forming the desired texture. For example, multiple texturing features can be formed simultaneously by a pressing or stamping operation, in lieu of laser texturing. An etching process also may be used, although present etching techniques are not expected to yield features with the desired smoothness in their curvature, and thus are less preferred.

Thus in accordance with the present invention, the texturing features throughout a contact zone are shaped to exhibit profiles that resemble Gaussian curves, especially in the direction of travel of the data storage medium relative to data transducing heads. A rapid decay of higher order harmonics of the fundamental frequencies arising from a constant pitch of the texturing features, considerably diminishes the chances of resonance effects based on such frequencies and the natural frequencies of the head and its gimbal and support system. This is particularly advantageous during glide avalanche testing, because the reduced occurrence of resonance effects leads to correspondingly reduced false failure indications.

IN THE DRAWINGS

For a further appreciation of the above and other features and advantages, reference is made to the following detailed description and to the drawings, in which:

FIG. 5 is a chart showing a glide avalanche curve for a disk textured as shown in FIGS. 3 and 4;

DETAILED DESCRIPTION OF THE PREFERRED EMBODIMENTS

Figure 1:
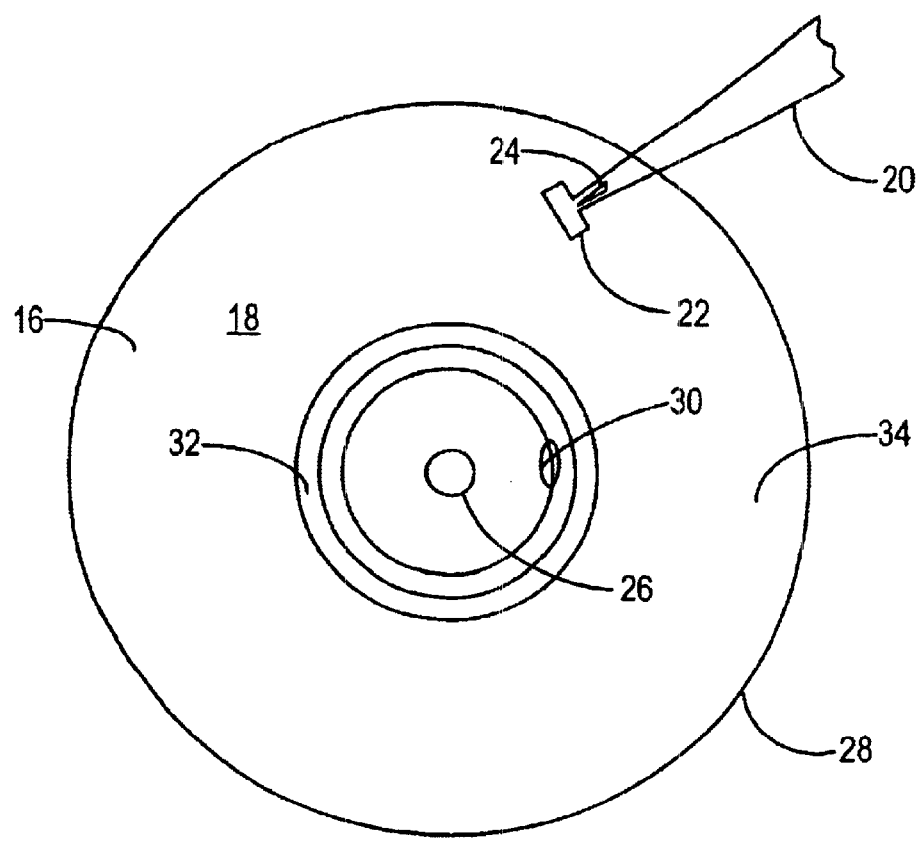
FIG. 1 is a plan view of a magnetic data storage disk having a texture pattern including multiple texturing features formed in accordance with the present invention, and a data transducing head supported for generally radial movement relative to the disk.
Figure 2:
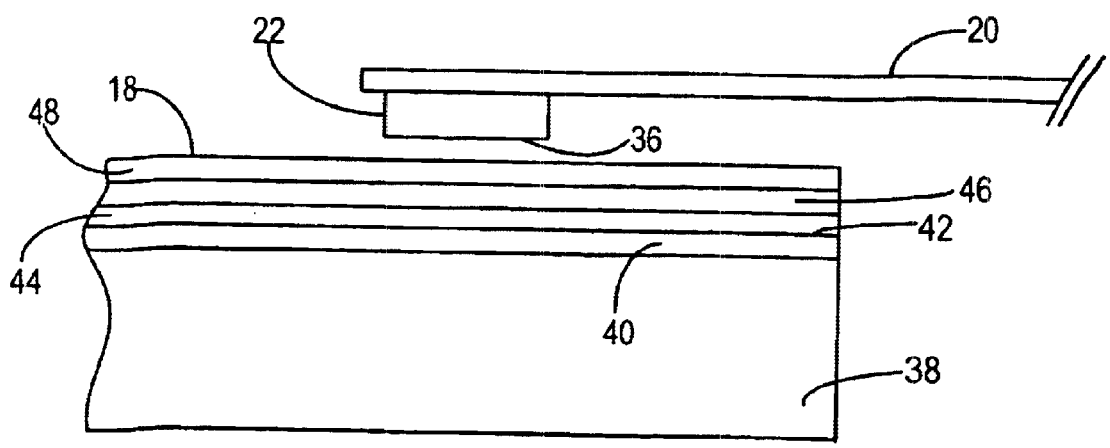
FIG. 2 is an enlarged partial sectional view of the magnetic data storage disk in FIG. 1.

Turning now to the drawings, there is shown in FIGS. 1 and 2 a medium for reading and recording magnetic data, in particular a magnetic disk 16 rotatable about a vertical axis and having a substantially planar horizontal upper surface 18. A rotary actuator (not shown) carries a transducing head support arm 20 in cantilevered fashion. A magnetic data transducing head 22 (including a magnetic transducer and an air bearing slider) is mounted to the free end of the support arm through a suspension 24 which allows gimballing action of the head, i.e., limited vertical travel and rotation about pitch and roll axes. The rotary actuator and the support arm pivot to move head 22 in an accurate path, generally radially with respect to the disk.

At the center of disk 22 is an opening to accommodate a disk drive spindle 26 used to rotate the disk. Between the opening and an outer circumferential edge 28 of the disk, upper surface 18 is divided into three annular regions or zones: a radially inward zone 30 used for clamping the disk to the spindle; a dedicated transducing head contact zone 32; and a data storage zone 34 that serves as the area for data operations such as recording and reading the magnetic data.

When the disk is at rest, or rotating at a speed substantially below its normal operating range, head 22 contacts upper surface 18. When the disk rotates at higher speeds, including normal operating range, an air bearing or cushion is formed by air flowing between the head and upper surface 18 in the direction of disk rotation. The air bearing supports the head above the upper surface. Typically the distance between a planar bottom surface 36 of head 22 and upper surface 18, known as the head "flying height," is about one microinch (25.4 nm). Lower flying heights permit a higher density storage of data.

For data recording and reading operations, rotation of the disk and pivoting of the support arm are controlled in concert to selectively position transducing head 22 near desired locations within data zone 34. Following a data operation, the disk is decelerated and support arm 20 is moved radially inward toward contact zone 32. By the time the disk decelerates sufficiently to allow head/disk contact, the head is positioned over the contact zone. Thus, head contact with other regions of the disk surface is avoided. Before the next data operation, the disk is accelerated, initially with head 22 engaged with disk 16 within the contact zone. Support arm 20 is not pivoted until the head is supported by an air bearing, above the contact zone.

Magnetic disk 16 is formed by mechanically finishing a glass substrate disk 38 to provide a substantially flat upper surface. Alternatively, a nickel-phosphorous alloy is plated onto the upper surface of the substrate disk, to provide a non-magnetizable layer with a uniform thickness in the range of about 2–12 microns. Following plating, a glass layer 40 is applied, and the exposed upper surface 42 of the glass layer is polished to a roughness of about 0.1 micro inch (2.54 nm) or less.

After mechanical finishing, substrate surface 42, at least along contact zone 32, is laser textured to provide a desired surface roughness. Laser texturing involves melting the substrate disk at and near surface 42, forming texturing features as will be described in greater detail below.

Fabrication of disk 16 involves the application of several layers after texturing. The first of these is a chrome underlayer 44 with a typical thickness of about 10–100 nm. Next is a magnetic thin film recording layer 46, where the data are stored, typically at a thickness of about 10–50 nm. The final layer is a protective carbon layer 48, in the range of 5–30 nm in thickness. Layers 44, 46 and 48 are substantially uniform in thickness, and thus replicate the texture of substrate surface 42.

Figure 3:
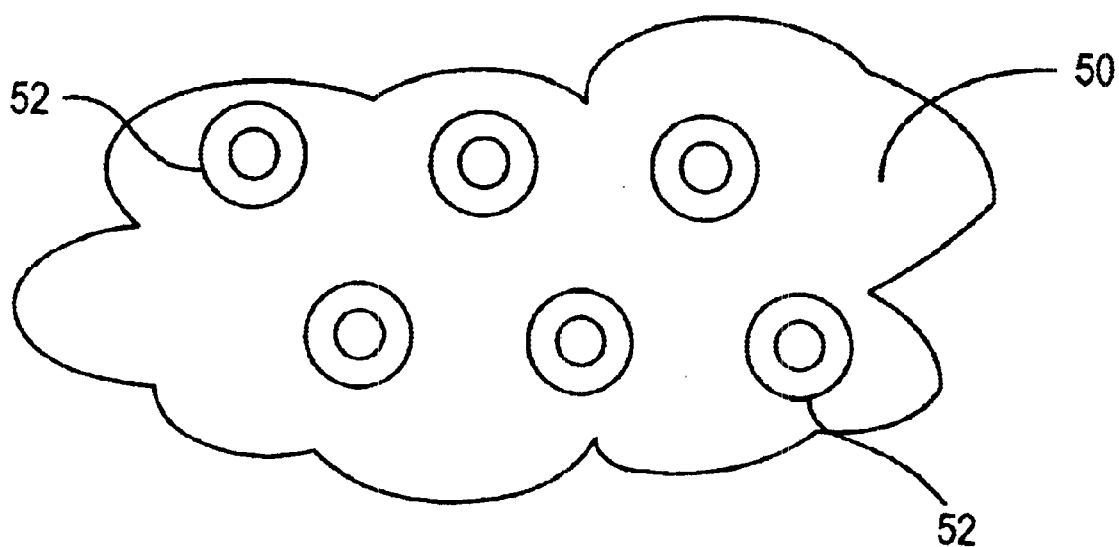
FIG. 3 is an enlarged partial top view of a dedicated contact zone or landing zone of a magnetic data storage disk textured according to a traditional laser texturing approach.
Figure 4A:
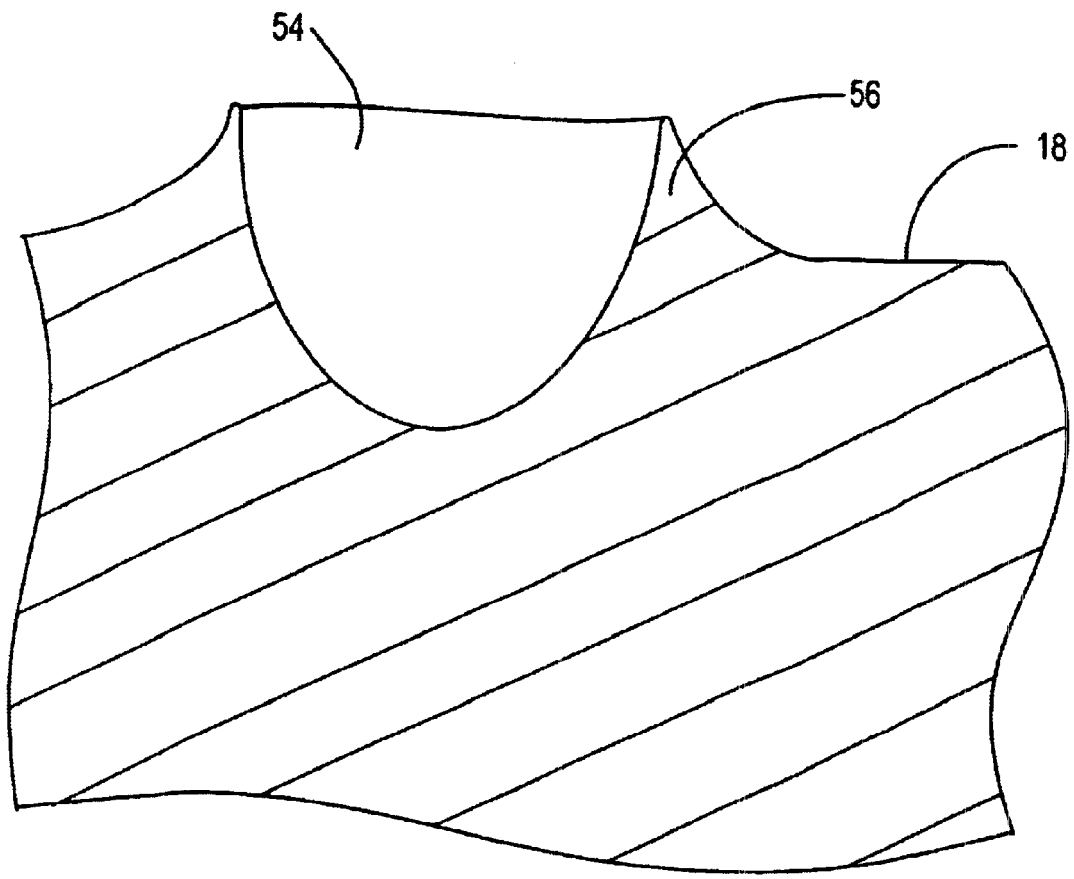
FIG. 4a is an enlarged side profile view of one of the texturing features shown in FIG. 3.
Figure 4B:
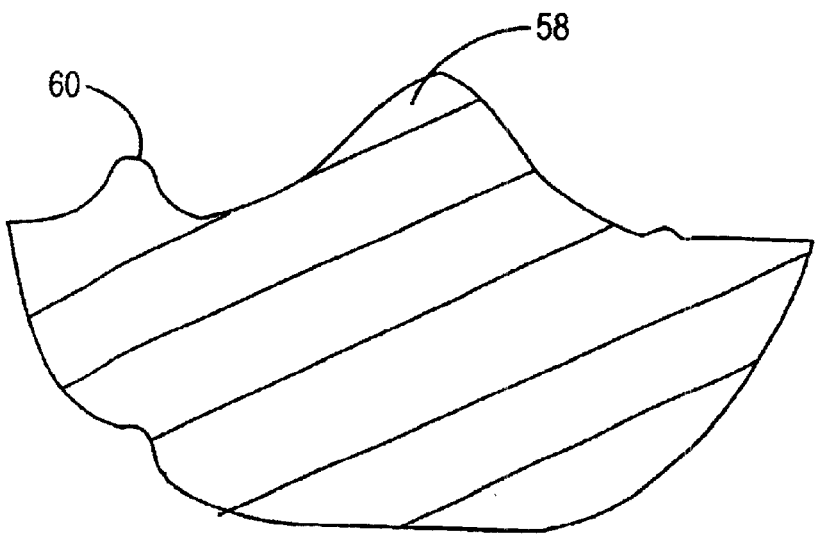
FIG. 4b illustrates another conventional texturing feature profile.

Laser texturing involves forming discrete texturing features in the substrate disk. The size and shape of the features depends on the level of laser beam energy impinging upon the disk surface. Typically the features are formed in a spiral path, having a circumferential pitch governed by the disk rotational speed and laser pulsing interval during texturing. A radial pitch, i.e., the radial distance between consecutive turns of the spiral path, is determined by disk rotation and the rate of radial shifting of the laser relative to the disk. The result of the traditional laser texturing of an Al Ni—P substrate, as seen in FIG. 3, is a disk 50 having a textured head contact zone with a uniform circumferential pitch, i.e., a uniform spacing or distance interval between consecutive features 52. As perhaps best seen in FIG. 4a, each of texturing features 52 includes a depression 54 surrounded by a raised rim 56, which usually is circular but also can be elliptical. The features frequently are referred to as craters. FIG. 4b shows another type of texturing feature formed at significantly lower laser power, namely a dome 58 surrounded by a small rim 60. The domes have diameters less than 1 micron, and profiles with slopes that increase continually from the top of the dome to the substrate surface (correct?). The features can be formed with a high degree of uniformity in rim height (distance between the rim peaks and a nominal surface plane of the disk) typically in the range of about 5–30 nm. This provides a uniform surface roughness, substantially throughout the contact zone.

The uniformity in roughness, when coupled with a uniform circumferential pitch, leads to input excitation frequencies that vary linearly with the circumferential speed of the disk relative to the transducing head. During transducing head takeoffs and landings, these input excitation frequencies or their harmonics can coincide with natural resonant frequencies of the transducing head or the head support structure, including the gimbal arrangement that allows adjustments in head orientation about mutually perpendicular pitch and roll axes. The resonance effects are present during glide avalanche measurements, and can produce an erroneous indication that a disk has failed a glide test, and make it difficult to determine the glide avalanche breaking point.

Glide testing is done to ensure quality of the data storage media. Testing is done with a glide head including an air bearing slider and a piezoelectric transducer mounted to the slider. As the head flies over the disk surface at a predetermined clearance or glide height, the transducer generates signals (a voltage output) representing proximity to, or even contact with, texturing features or defects. If the voltage output exceeds a predetermined threshold level, the disk is rejected.

FIG. 5 is a chart showing a glide avalanche curve for a conventionally textured disk, with spikes 62 indicating a match of the excitation frequencies (or harmonics) with natural frequencies of the air bearing or its gimbal and support system. Resonance effects can cause erroneous tests results indicating failure of the disk, when in fact the disk has not failed. For example, if the threshold of the glide test were set to 1.5 volts, the disk under test would fail a 0.95 microinch glide test. Without the resonance effect the disk would pass the test.

Figure 6:
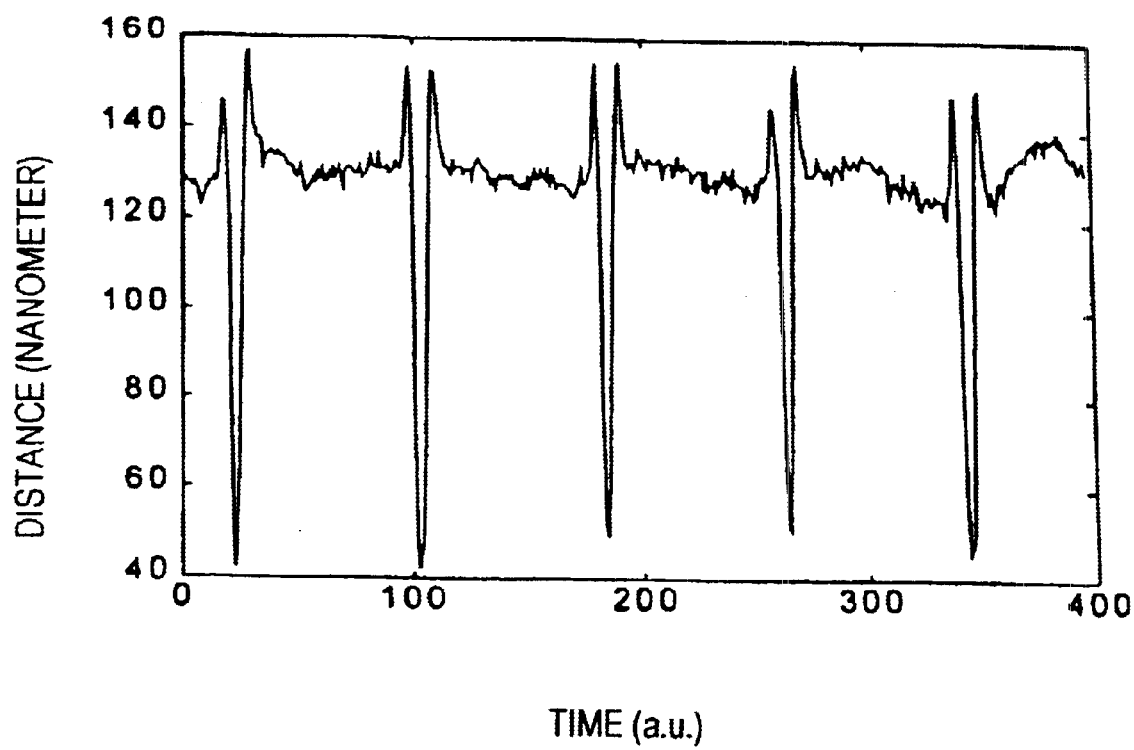
FIG. 6 is an input excitation profile of a series of the texturing features shown in FIG. 3.
Figure 7:
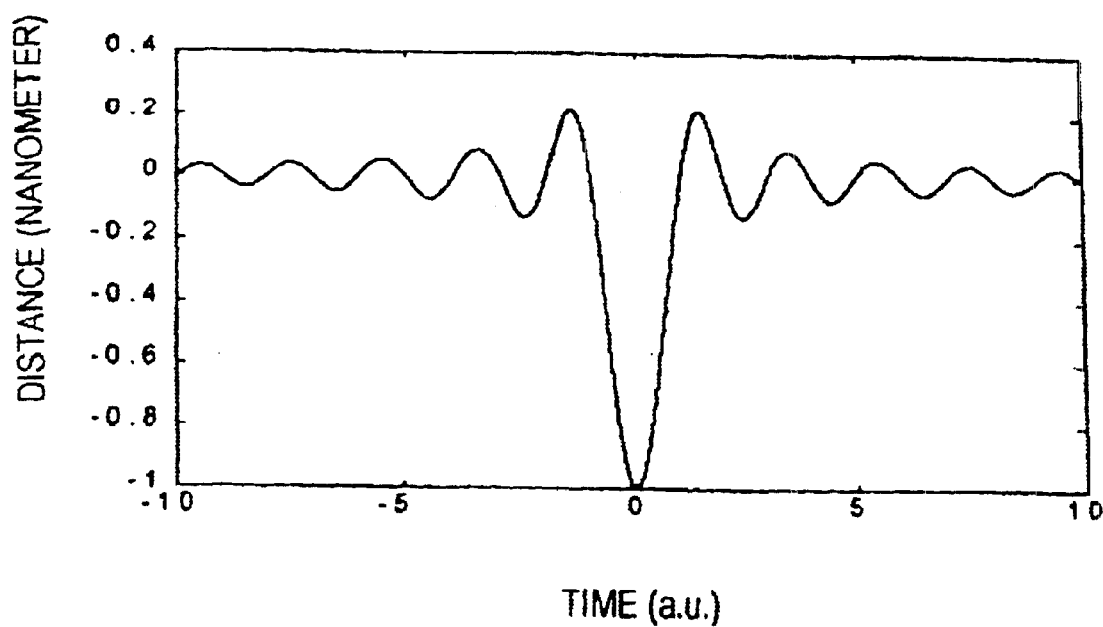
FIG. 7 is a sinc function simulating one of the texturing features shown in FIG. 6.
Figure 8:
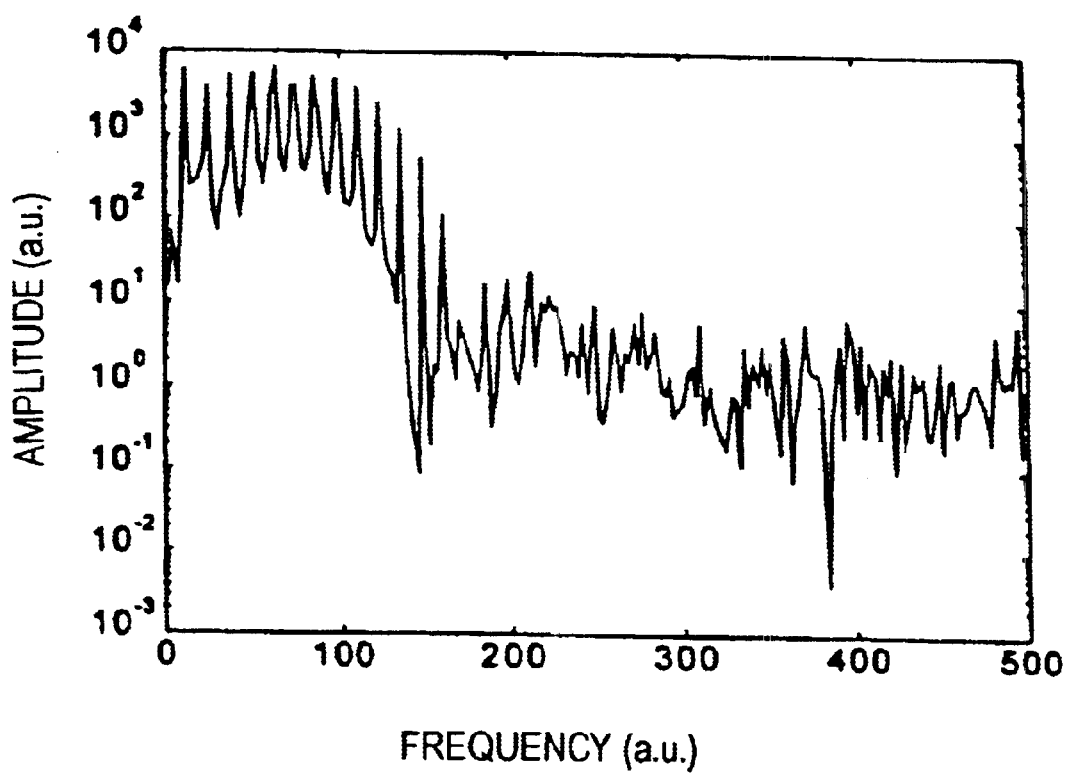
FIG. 8 shows a Fourier Transform of the input excitation.

FIG. 6 is an input excitation plot of distance (nanometers) as a function of time in arbitrary units, showing a series of crater-like texturing features encountered by a transducer while the disk is being rotated. FIG. 7 is a sinc function simulating one of the texturing features shown in FIG. 6. FIG. 8 shows a Fourier Transform of the input excitation, showing amplitude as a function of frequency. The amplitude exhibits some decay as the frequency increases.

Figure 9:
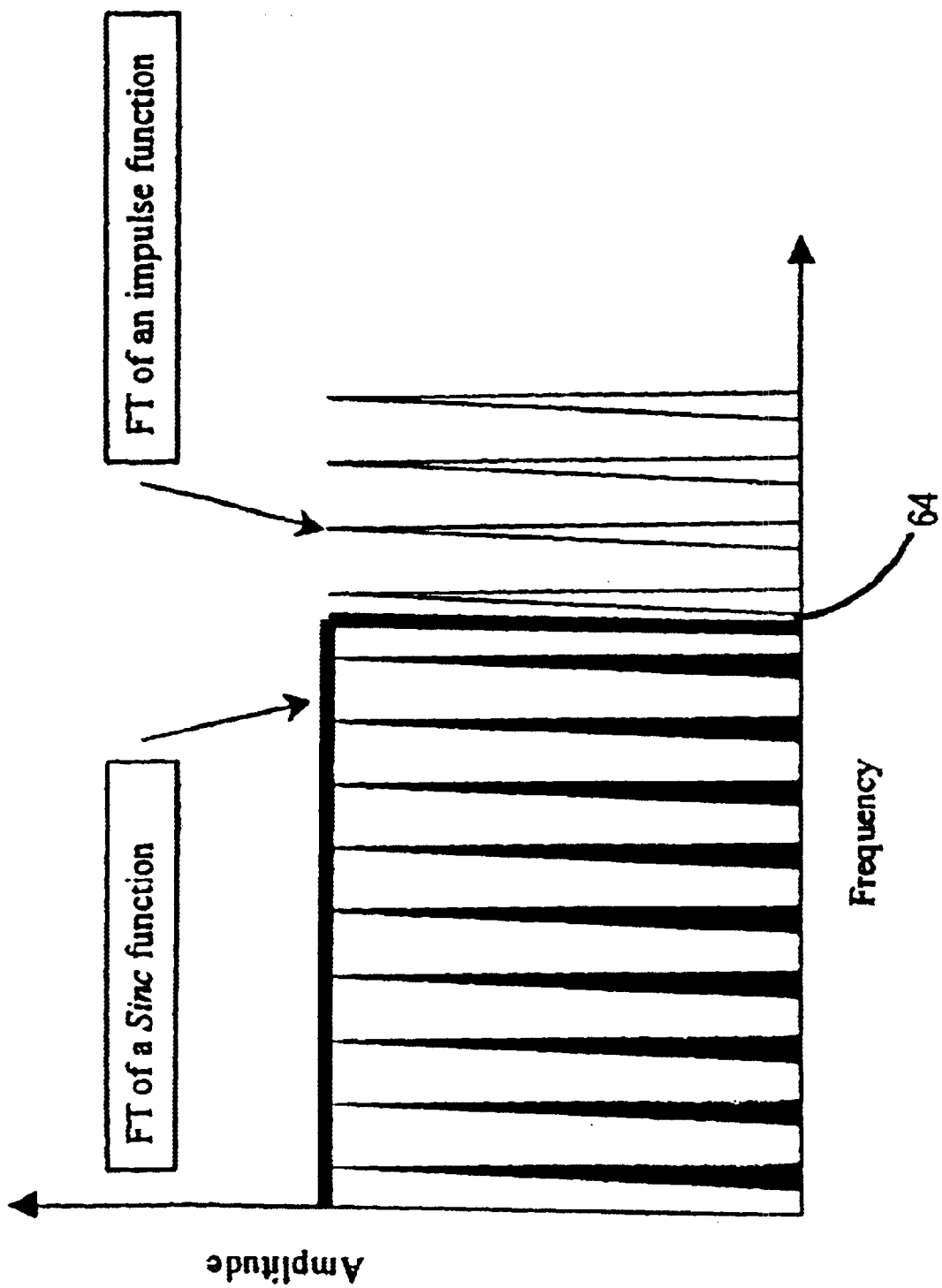
FIG. 9 shows a Fourier Transform of the sinc function shown in FIG. 7.

Based on the input excitation profile in FIG. 6, a sinc function can be generated to represent a single crater-like texturing feature, as shown in FIG. 7. A series of the texturing features can be modeled with a convolution of the sinc function with an impulse train. The convolution in a time domain is equivalent to a multiplication in the frequency domain. Thus, the input excitation in the frequency domain is equivalent to a Fourier Transform of the shape function, multiplied by a Fourier Transform of the impulse train. FIG. 9 illustrates the Fourier Transform of the sinc function, and beyond the vertical bold line 64 illustrates a Fourier Transform of the impulse function. The steep triangles represent the fundamental frequency, labeled x, and successive harmonics of the fundamental frequency, some of which are labeled, e.g., 3x, 5x, etc. The triangles are solid, indicating the lack of any significant decay. With crater-type texturing features the decay of the higher order harmonics is slow, with discernible amplitudes present up to the 40th order.

Figure 10:
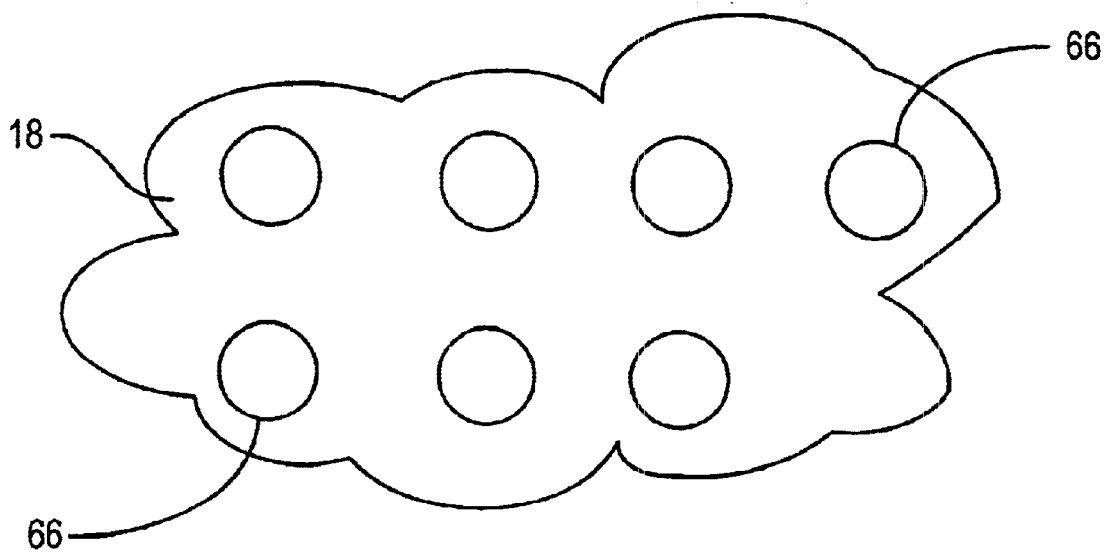
FIG. 10 is a partial top view of the disk in FIG. 1 showing the contact zone or landing zone.
Figure 11:
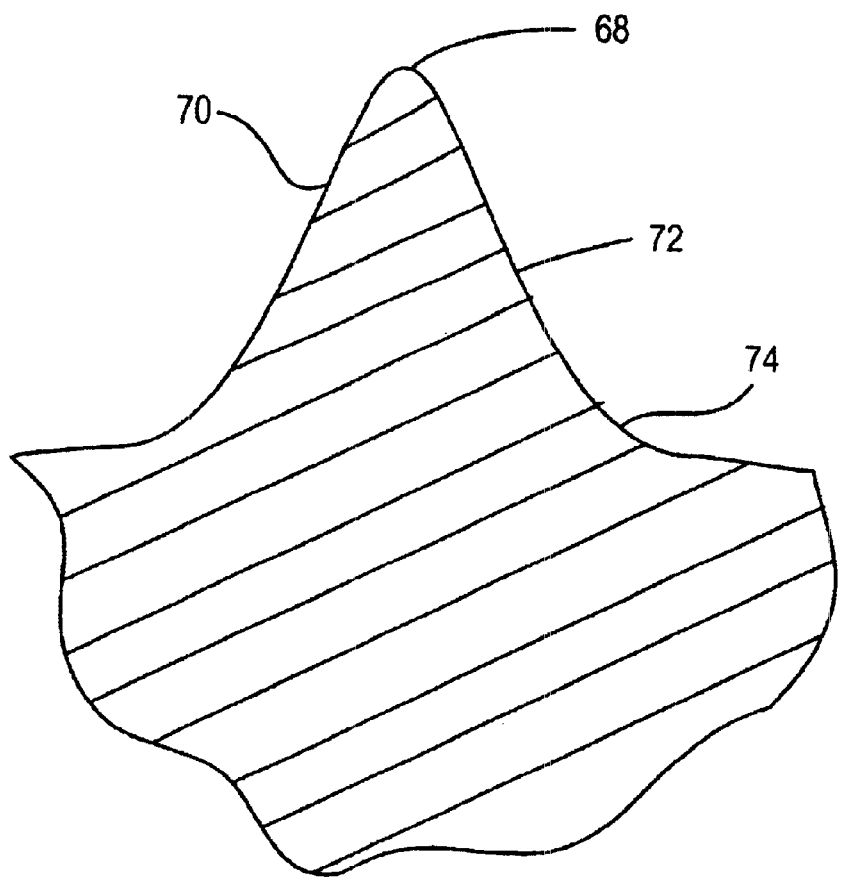
FIG. 11 is a side sectional view of one of the texturing features shown in FIG. 10.
Figure 11A:
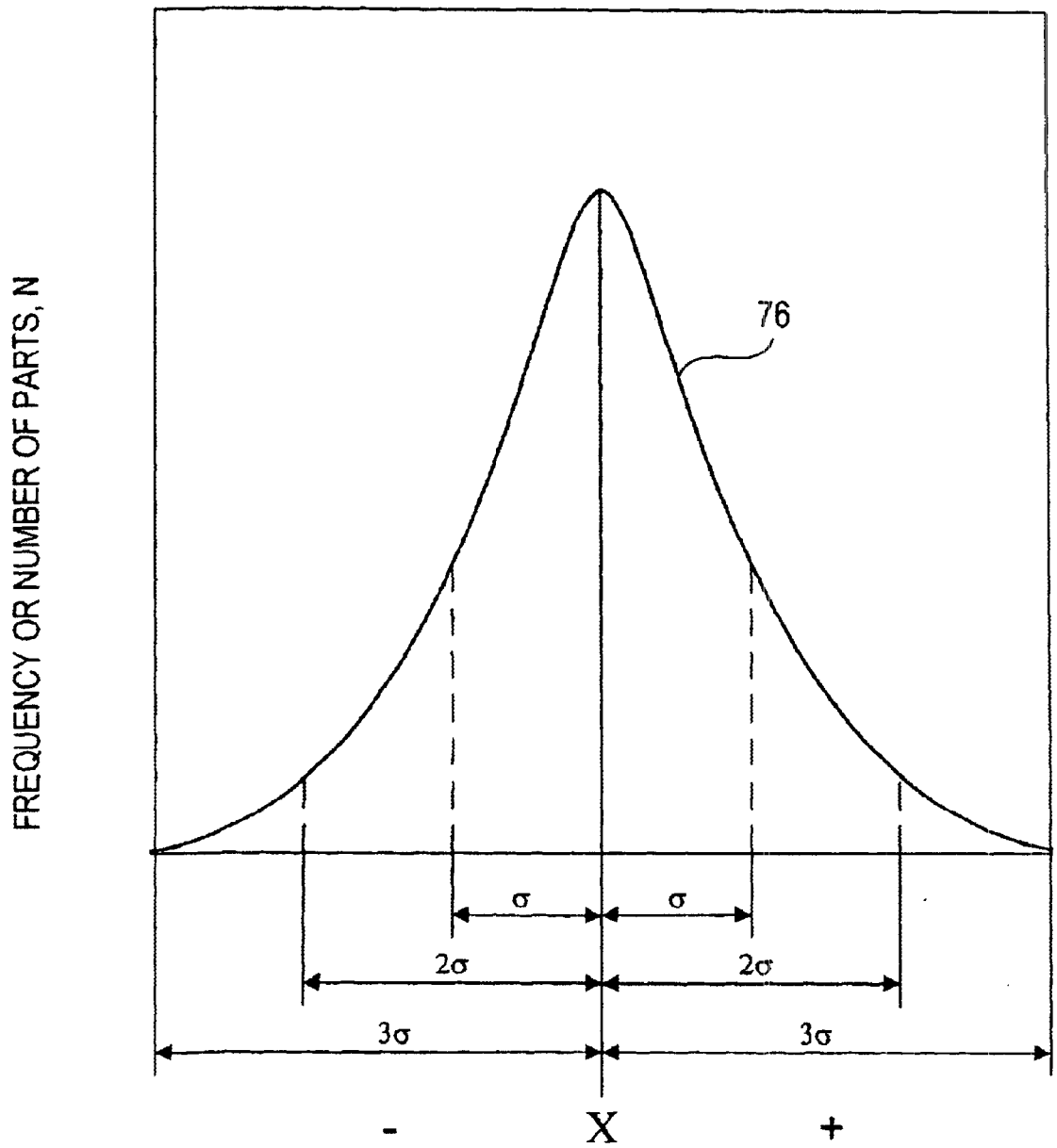
FIG. 11a shows a Gaussian curve corresponding to the feature in FIG. 10.

In accordance with the present invention, the texturing features are shaped in a manner that considerably quickens the decay of the higher order harmonics, and thus reduces resonance effects. As seen in FIG. 10, multiple texturing features 66 are formed in contact zone 32. FIG. 11 is a sectional view of one of features 66, taken along a plane extending in the direction of disk travel, i.e., tangentially (approximately circumferentially) through the center of the feature, to reveal a point of maximum height 68. The slope of the texturing feature profile is zero, corresponding to a horizontal profile segment. Along an upper region 70 of the texturing feature, the profile slope increases in both directions away from point 68 to a maximum slope along a medial region 72. Along a lower region 74 of the texturing feature, the slope decreases, eventually reaching zero. FIG. 11a shows a Gaussian curve 76 corresponding to the profile of the texturing feature. The maximum height h corresponds to the mean of the normal curve. The standard deviation σ of a normal curve corresponds to ⅙th of the diameter of texturing feature 66 at its base. The texturing feature diameter is at least three microns, and more preferably is in the range of 3–5 microns, corresponding to a σ of 0.5–0.833 microns.

Texturing feature 66 is symmetrical about a vertical line through point 68, so that the bell-shaped or Gaussian profile is produced by any plane perpendicular to surface 18 and containing point 68, regardless of whether the plane is tangential, radial, or at any intermediate orientation. Profiles produced by sectioning texturing feature 66 along planes perpendicular to surface 18 but not passing through point 68 are likewise Gaussian, provided that the planes are sufficiently near point 68 to encompass upper region 70 of the texturing feature.

Figure 12:
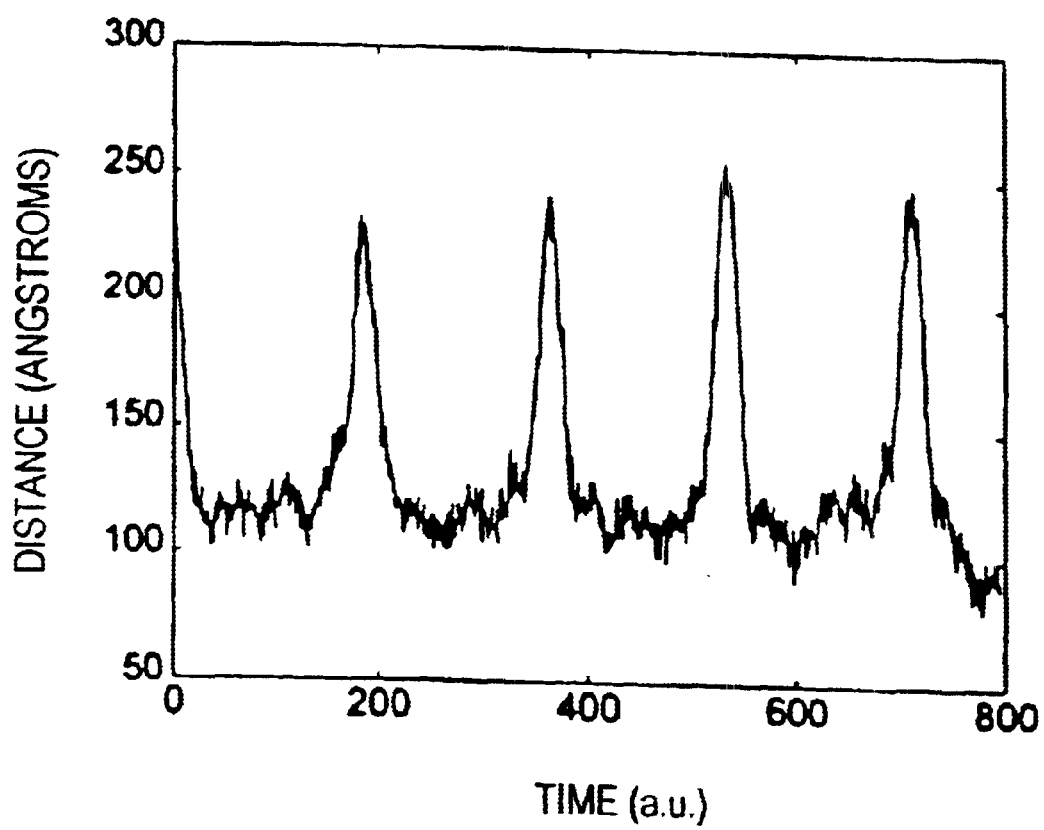
FIG. 12 is an input excitation profile of the disk in FIGS. 1 and 10.
Figure 13:
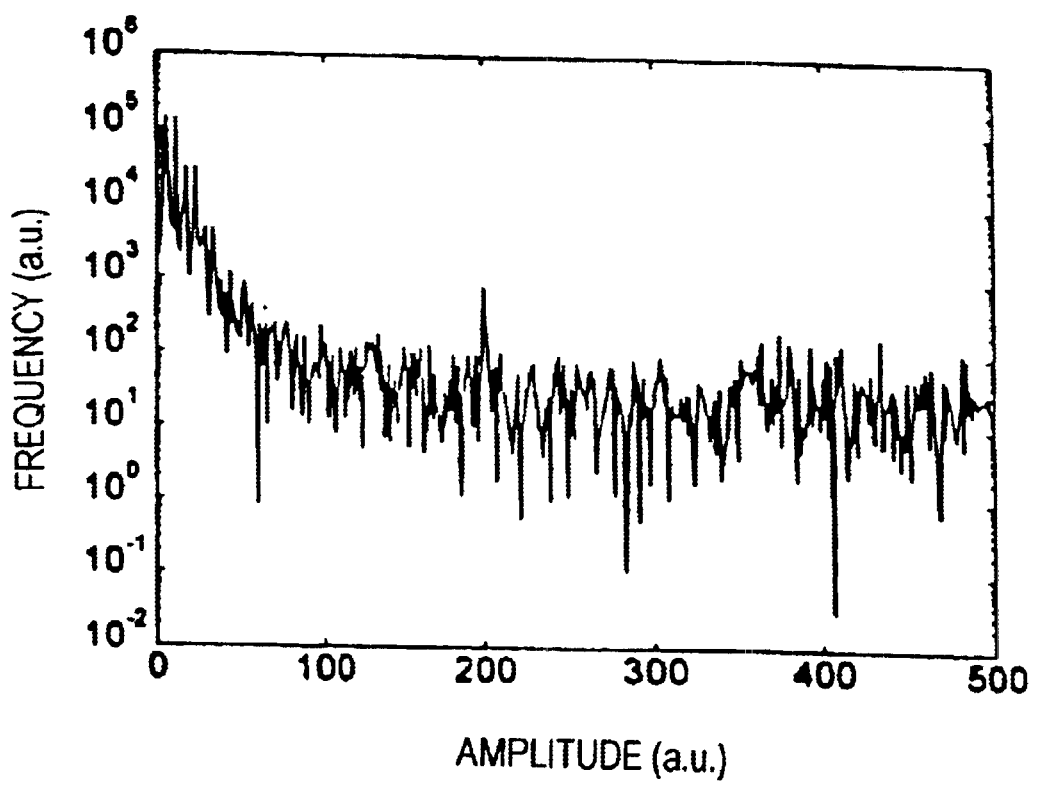
FIG. 13 is a Fourier Transform of one of the input excitation profile in FIG. 12.

The advantage arising from forming texturing features like feature 66, conveniently called Gaussian texturing features due to their profiles, can be understood by comparing their characteristics with corresponding characteristics of the traditional crater-like features. For example, FIG. 12 is an input excitation profile similar to that in FIG. 6, showing distance (angstroms) as a function of time with respect to a series of Gaussian texturing features. A Fourier Transform of the input excitation profile is shown in FIG. 13. A comparison of FIGS. 13 and 7 demonstrates the rapid and substantial decay of higher order frequencies in connection with Gaussian features, as compared to the slower decay corresponding to crater-like features.

Figure 14:
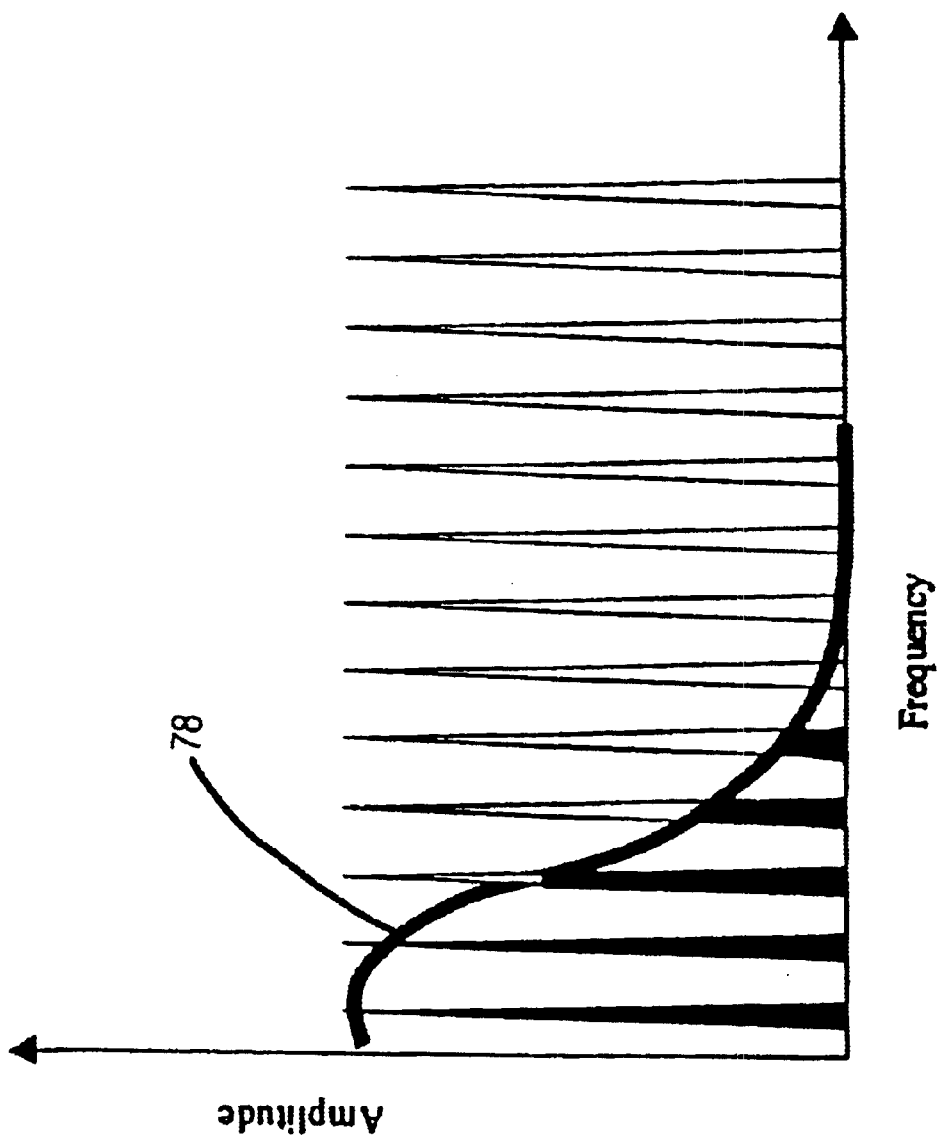
FIG. 14 is a Fourier Transform of a sinc function simulating one of the texturing features in FIG. 12.

FIG. 14 is a Fourier Transform of a sinc function of a Gaussian texturing feature superimposed on a Fourier Transform of an impulse function. As in FIG. 9, the triangles represent the fundamental frequency and its harmonics. The rapidly diminishing amplitudes in the higher order harmonics are represented by the levels of the solid portions of the triangles, traced by a bold line 78. Comparison of FIGS. 9 and 14 demonstrates the dramatic difference in performance of the respective texturing feature shapes, in terms of the decay of higher order harmonics.

Figure 15:
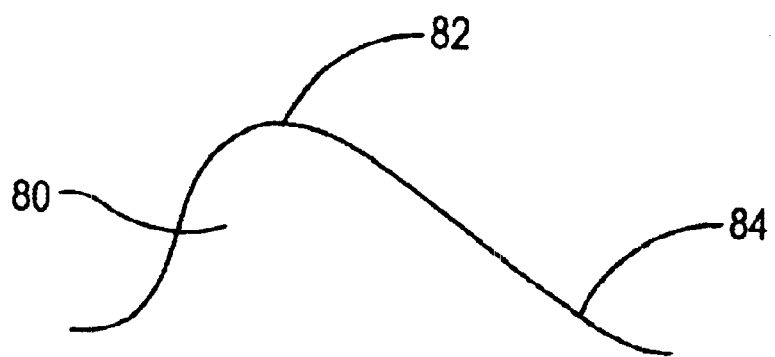
FIG. 15 illustrates, in side profile view, an alternative embodiment texturing feature with an asymmetry with respect to a plane through its point of maximum height.

FIG. 15 illustrates the profile of an alternative embodiment texturing feature 80, produced by a tangential (approximately circumferential) plane through a maximum height point 82 of the feature. Feature 80 has a bell-shaped profile in the sense that in both directions away from point 82, the slope of the profile increases to a maximum at a medial region of the feature, then decreases to provide a flare 84. However, the profile is asymmetrical, in that to the left of point 82, the profile exhibits more rapid changes (both increases and decreases) in slope.

Figure 16:
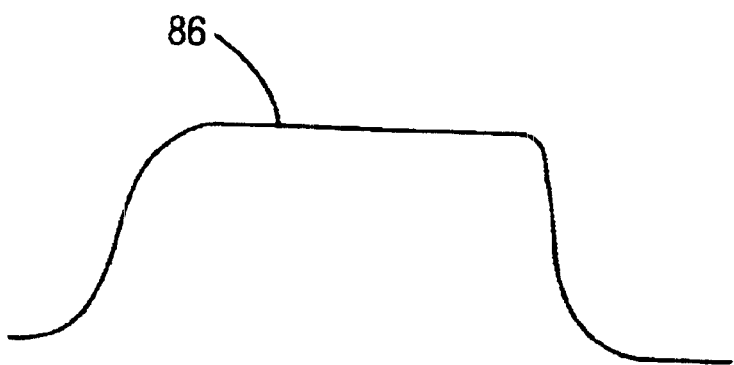
FIG. 16 illustrates, in end profile view, another alternative embodiment texturing feature.

FIG. 16 illustrates the profile of another alternative embodiment texturing feature 86, generated by a radial plane perpendicular to surface 18 through a midpoint 88, i.e., a plane perpendicular to the tangential planes through features 80 and 66. Texturing feature 86 is shaped such that a tangential plane taken through midpoint 88 would generate a Gaussian profile. The profile shown in FIG. 16 is non-Gaussian, illustrating the point that the advantages of the present invention can be realized when the texturing features are shaped to exhibit Gaussian profiles taken in planes parallel to the direction of travel, i.e., planes tangential to a spiral or circumferential pattern of texturing features. Profiles generated by radial planes need not be Gaussian.

The bell-shaped laser texturing features can be formed with devices of the type known for forming conventional, crater-like texturing features, subject to certain parameter adjustments and, in connection with aluminum nickel-phosphorous substrates, an additional processing step. More particularly, the laser power and intensity distribution transversely across the laser beam can be similar. However, the laser beam itself is set, more precisely less narrowly focused, to provide a larger spot or impingement area on surface 42 of the substrate. The impingement area should have a diameter of at least 3 microns, more preferably 3–5 microns, corresponding to the desired texturing feature diameter.

In connection with aluminum nickel-phosphorous substrates, it has been found that laser beams of sufficient intensity for features of the desired size produce crater-like features. A sufficient reduction in laser power and laser beam diameter can produce dome-like features, but of a size too small (less than one micron in diameter) to afford the benefits of the present invention. Accordingly, if an aluminum nickel-phosphorous substrate is employed, a glass coating is applied prior to texturing. Then, the appropriately sized laser beam is employed to generate the texturing features in the glass, rather than in the nickel-phosphorous layer.

Thus, in accordance with the present invention, a substrate texturing process yields a texturing pattern that can exhibit a constant circumferential pitch and a constant radial pitch, yet minimize resonance effects. The texturing features have Gaussian or bell-shaped profiles that, in combination with their diameters, lead to a rapid decay of higher order harmonics of the fundamental frequencies due to the circumferential pitch. As a result, glide avalanche testing is more reliable, since resonance effects, and the corresponding false failure indications during testing, are kept to a minimum.

Frequently, the texturing features are symmetrical about a central axis, and exhibit Gaussian profiles in any plane that contains the axis. However, satisfactory performance requires such profiles in the direction of recording medium travel.

What is claimed is:

1. A substrate for a data storage medium comprising a data zone for storing data and a contact zone textured for contact with a data transducing head maintained spaced apart from the data zone by an air bearing during use of the data storage medium, said substrate comprising:
    a substrate body having a substantially planar substrate surface including a data zone and a contact zone, said substrate body adapted for movement substantially parallel to the substrate surface in a first direction with respect to a data transducing head, said substrate surface made of glass; and
    a plurality of texturing features formed in the contact zone and projected outwardly from the substrate surface, each of the texturing features having bell-shaped profiles taken in planes substantially perpendicular to the substrate surface, and wherein said texturing features further have substantially circular profiles in the substrate surface with diameters of at least about three microns.

2. The substrate of claim 1 wherein:
    each of the texturing features is symmetrical about a bisecting plane substantially perpendicular to the substrate surface and substantially perpendicular to the predetermined direction.

3. The substrate of claim 2 wherein:
    said bell-shaped profiles define Gaussian curves having standard deviation values (σ) greater than about 0.5 microns.

4. The substrate of claim 1 wherein:
    said texturing features project outwardly from the substrate surface by heights in the range of 5–30 nm.

5. The substrate of claim 4 wherein:
    the texturing features have a substantially uniform height.

6. The substrate of claim 1 wherein:
    said texturing features have diameters in the range of about 3–5 microns.

7. The substrate of claim 6 wherein:
    the diameters of the texturing features are substantially uniform.

8. The substrate of claim 1 wherein:
    said substrate body is disk shaped, the contact zone is annular, and the predetermined direction is circumferential with respect to the substrate body.

9. The substrate of claim 8 wherein:
    said texturing features are arranged in a pattern having a substantially uniform circumferential pitch.

10. The substrate of claim 9 wherein:
    said texture pattern further has a substantially uniform radial pitch.

11. The substrate of claim 1 wherein:
    said substrate body is fabricated of glass.

12. The substrate of claim 1 wherein:
    said substrate is constructed of aluminum and incorporates a nickel-phosphorous layer, and further includes a glass layer applied to the substrate body over the nickel-phosphorous layer, wherein the substrate surface comprises a surface of the glass layer.

13. The substrate of claim 1 further including:
    a thin film recording layer of a magnetizable material, formed over the substrate surface, the recording layer having a substantially uniform thickness and thereby tending to replicate a topography of the substrate.

14. The substrate of claim 13 further includes:
    a chromium underlayer formed over the substrate surface and disposed between the substrate surface and the magnetic recording layer, and a cover layer formed over the magnetic recording layer; said underlayer and cover layer being of substantially uniform thickness whereby the cover layer tends to replicate a topography of the substrate.

15. The substrate of claim 1 wherein:
    each of said texturing features further has bell-shaped profiles taken in planes substantially perpendicular to the substrate surface and substantially perpendicular to the predetermined direction.

16. The substrate of claim 15 wherein:
    said texturing features are symmetrical about bisecting planes perpendicular to the substrate surface.

17. A data storage medium including:
    a storage medium body having a substantially planar and horizontal storage medium surface, said storage medium surface made of glass, having a contact zone and moveable in a first direction with respect to a data transduciug head maintained spaced apart from said storage medium surface; and
    a plurality of texturing features formed in said contact zone of said storage medium surface and projected upwardly therefrom, wherein each of said texturing features having bell-shaped profiles taken in planes substantially perpendicular to said storage medium surface and said texturing features further having substantially cup profiles in the substrate surface of at least about three microns, each said bell-shaped profile characterized by a maximum height point at which a slope of said bell-shaped profile is zero, a first downward curvature away from the maximum height point at a smoothly increasing slope to a maximum slope along a medial region of the texturing feature, and a second upward curvature away from the medial region at a smoothly decreasing slope to create an outward flare at a bottom portion of the texturing feature.

18. The data storage medium of claim 17 wherein:
the maximum height point is at the center of the profile.

19. The data storage medium of claim 18 wherein:
each of the texturing features is symmetrical about a vertical bisecting plane substantially perpendicular to the first direction.

20. The data storage medium of claim 19 wherein:
said profiles define Gaussian curves having standard deviation values (σ) greater than about 0.5 microns.

21. The data storage medium of claim 20 wherein:
said profiles taken in vertical planes oriented in the first direction define Gaussian curves.

22. The data storage medium of claim 21 wherein:
each of the texturing features further is shaped to provide further profiles taken in vertical planes substantially perpendicular to the first direction, with said further profiles defining Gaussian curves.

23. The data storage medium of claim 17 wherein:
the texturing features project upwardly from the storage medium surface by heights in the range of about 5–30 nm.

24. The data storage medium of claim 23 wherein:
the texturing features have a substantially uniform height.

25. The data storage medium of claim 17 wherein:
the texturing features have diameters in the range of about 3–5 microns.

26. The data storage medium of claim 25 wherein:
the diameters of the texturing features are substantially uniform.

27. The data storage medium of claim 17 wherein:
the storage medium body is disk-shaped, and the first direction is circumferential with respect to the storage medium body.

28. The data storage medium of claim 27 wherein:
the texturing features are arranged in the pattern having a substantially uniform circumferential pitch.

29. The data storage medium of claim 28 wherein:
the texturing feature pattern further has a substantially uniform radial pitch.

30. The data storage medium of claim 17 wherein:
the storage medium body comprises a substrate consisting essentially of glass.

31. The data storage medium of claim 17 wherein:
the storage medium body comprises a substrate constructed of aluminum incorporating a nickel-phosphorous layer, and a glass layer applied to the substrate over the nickel-phosphorous layer, wherein the multiple texturing features are formed in the glass layer.

32. The data storage medium of claim 17 wherein:
the storage medium body includes a substantially horizontal thin film recording layer formed of a magnetizable material.

33. The data storage medium of claim 17 wherein:
the texturing features are symmetrical about vertical bisecting planes.

* * * * *